(12) United States Patent
Chavan et al.

(10) Patent No.: US 11,799,319 B2
(45) Date of Patent: Oct. 24, 2023

(54) POWER SUPPLY SYSTEM RESPONSIVE TO HIGH AND LOW LINE CURRENTS

(71) Applicant: Smart Wires Inc., Union City, CA (US)

(72) Inventors: Govind Chavan, Union City, CA (US); Amrit Iyer, Oakland, CA (US); Haroon Inam, San Jose, CA (US); Faisal Masood, Lahore (PK); Abdul Rahman, Punjab (PK); Vinod Babu, Karnataka (IN)

(73) Assignee: Smart Wires Inc., Durham, NC (US)

( * ) Notice: Subject to any disclaimer, the term of this patent is extended or adjusted under 35 U.S.C. 154(b) by 337 days.

(21) Appl. No.: 17/249,281

(22) Filed: Feb. 25, 2021

(65) Prior Publication Data
US 2021/0296930 A1    Sep. 23, 2021

(30) Foreign Application Priority Data

Mar. 18, 2020  (PK) .................................. 186/2020

(51) Int. Cl.
| H02J 50/00 | (2016.01) |
| H02J 50/10 | (2016.01) |
| H02H 9/02 | (2006.01) |
| H02J 7/02 | (2016.01) |
| H02J 7/34 | (2006.01) |

(52) U.S. Cl.
CPC ............. *H02J 50/001* (2020.01); *H02H 9/02* (2013.01); *H02J 7/02* (2013.01); *H02J 50/10* (2016.02); *H02J 7/345* (2013.01); *H02J 2207/50* (2020.01)

(58) Field of Classification Search
CPC .. H02J 50/001; H02J 7/02; H02J 50/10; H02J 7/345; H02J 2207/50; H02J 3/00125; H02J 2207/20; H02J 7/00302; H02J 7/00714; H02J 7/007182; H02J 7/04; H02J 2310/23; H02J 5/00; H02J 7/00; H02J 9/005; H02J 9/007; H02H 9/02; H02H 1/06; H02H 3/24; H02M 1/10; H02M 3/33507; H02M 3/3385; H02M 5/225; H02M 7/797; H02M 3/285; H02M 3/335

See application file for complete search history.

(56) References Cited

U.S. PATENT DOCUMENTS

| 4,027,203 A | 5/1977 | Moran et al. |
| 4,194,147 A | 3/1980 | Payne et al. |
| 4,486,803 A | 12/1984 | Zylstra |
| 4,694,193 A | 9/1987 | Schlenk et al. |

(Continued)

*Primary Examiner* — John W Poos
*Assistant Examiner* — Tyler J Pereny
(74) *Attorney, Agent, or Firm* — Womble Bond Dickinson (US) LLP

(57) ABSTRACT

A power supply system is operable to harvest power at low and high line currents. A current transformer is arranged to couple to a power transmission line. A current sensor which may be a Rogowski coil is arranged to couple to the power transmission line. Branches of power supply circuitry are connected to a plurality of secondary windings of the current transformer. A control circuit selects one of the branches of power supply circuitry, depending on sensed magnitude of line current, to provide electrical power to an output capacitor. Sufficient stored energy is also provided for performing a backup of operating parameters when the line current reduces to zero.

20 Claims, 2 Drawing Sheets

(56) References Cited

U.S. PATENT DOCUMENTS

| | | | |
|---|---|---|---|
| 4,774,649 A * | 9/1988 | Archer | H02M 3/33538 |
| | | | 323/248 |
| 4,862,312 A | 8/1989 | Ishii | |
| 5,075,628 A | 12/1991 | Schuster et al. | |
| 5,103,164 A | 4/1992 | Kawaguchi et al. | |
| 5,168,198 A | 12/1992 | Watanabe | |
| 5,276,416 A | 1/1994 | Ozaki | |
| 5,555,494 A * | 9/1996 | Morris | H02M 3/33573 |
| | | | 363/17 |
| 5,905,619 A | 5/1999 | Jha | |
| 5,978,190 A | 11/1999 | Mignault | |
| 6,025,980 A | 2/2000 | Morron et al. | |
| 6,198,611 B1 | 3/2001 | Macbeth | |
| 6,229,679 B1 | 5/2001 | Macbeth | |
| 8,810,979 B2 | 8/2014 | Kinsel et al. | |
| 9,397,494 B2 | 7/2016 | Hofheinz et al. | |
| 9,496,828 B2 * | 11/2016 | Ye | H03F 3/189 |
| 10,241,136 B2 | 3/2019 | Rostron et al. | |
| 2011/0222194 A1 | 9/2011 | Kinsel et al. | |
| 2012/0212864 A1 | 8/2012 | Elms et al. | |
| 2013/0070374 A1 | 3/2013 | Hofheinz et al. | |
| 2013/0076306 A1 * | 3/2013 | Lee | H02J 50/12 |
| | | | 320/108 |
| 2017/0176511 A1 | 6/2017 | Moell et al. | |
| 2018/0210012 A1 | 7/2018 | Rostron et al. | |
| 2018/0351342 A1 | 12/2018 | Anderson et al. | |
| 2020/0373850 A1 * | 11/2020 | Valtysson | H02J 50/001 |

* cited by examiner

POWER SUPPLY SYSTEM RESPONSIVE TO HIGH AND LOW LINE CURRENTS

CROSS REFERENCE TO RELATED APPLICATIONS

This application claims the priority and benefit of Pakistan Patent Application No. 186/2020 filed on Mar. 18, 2020, the disclosure of which is incorporated herein by reference in its entirety.

TECHNICAL FIELD

Embodiments of the invention relate to a power supply for a power flow control unit attached to a power transmission line, as deployed in a power grid, and more particularly to a power supply that is responsive to both high and low currents flowing in a transmission line.

BACKGROUND

Load currents in a power transmission line, as deployed in a power grid, may vary from tens of amps to thousands of amps. A transient current arising from a fault may peak around 180 kA (kiloamperes). For the case of a power supply servicing a power flow control unit it is desirable that the power supply float near line potential. Thus, connection to a ground-based energy source is not available and the power supply must harvest energy from the transmission line. It should be capable of doing this when the line current is low, for example tens of amperes, while having an adaptable configuration that remains undamaged during peak fault currents.

SUMMARY

A power supply system and related method are described herein. The power supply system and the method are applicable to providing electrical power from a power transmission line.

In one embodiment, a power supply system is operable to harvest power at low and high line currents. A current transformer has a primary winding and multiple secondary windings. The primary winding is arranged to couple to a power transmission line. A current sensor senses line current in the power transmission line. The current sensor may be a Rogowski Coil. The system has an output capacitor. The system has multiple branches of power supply circuitry. Each branch of power supply circuitry is connected to one of the secondary windings of the current transformer. Each branch of power supply circuitry has a switch. The branches of power supply circuitry are connected to the output capacitor. A control circuit is coupled to the current sensor and coupled to the switches in the branches of power supply circuitry. The control circuit is to select the switch of one of the branches of power supply circuitry, depending on sensed magnitude of the line current, to provide electrical power to the output capacitor.

In one embodiment, a method is for harvesting power from a variable line current of a power transmission line. The method includes coupling a current sensor to the power transmission line for sensing the line current. The current sensor may be a Rogwoski Coil. The method includes coupling to the power transmission line a primary winding of a current transformer. The current transformer has the primary winding and a plurality of secondary windings. The method includes a control circuit coupled to the current sensor, determining to select a switch of one of a plurality of branches of power supply circuitry. The branches of power supply circuitry are coupled to the plurality of secondary windings of the current transformer. The selecting of a switch is based on sensed magnitude of the line current. Selecting a switch of one of the plurality of branches of power supply circuitry provides electrical power to an output capacitor.

DETAILED DESCRIPTION

Load currents in a power transmission line may vary from tens of amps to thousands of amps. A transient current arising from a fault may peak around 180 kA. A power supply system for use in a power flow control unit is described wherein this wide range of line currents is detected and sorted into current ranges, each range enabling a different branch of the power supply circuit. The power flow control unit may comprise an impedance injection unit or a current bypass unit as examples. The power supply harvests energy from the transmission line and is responsive to both low and high currents flowing in the transmission line. Thus, the power supply may provide useful power when the line current is as low as 50 A for example and may avoid damage during a peak transient current as high as 180 kA.

An energy storage circuit may be included to provide shut down power in the event of a transmission line current reducing to zero during a power grid anomaly.

Figure 1:
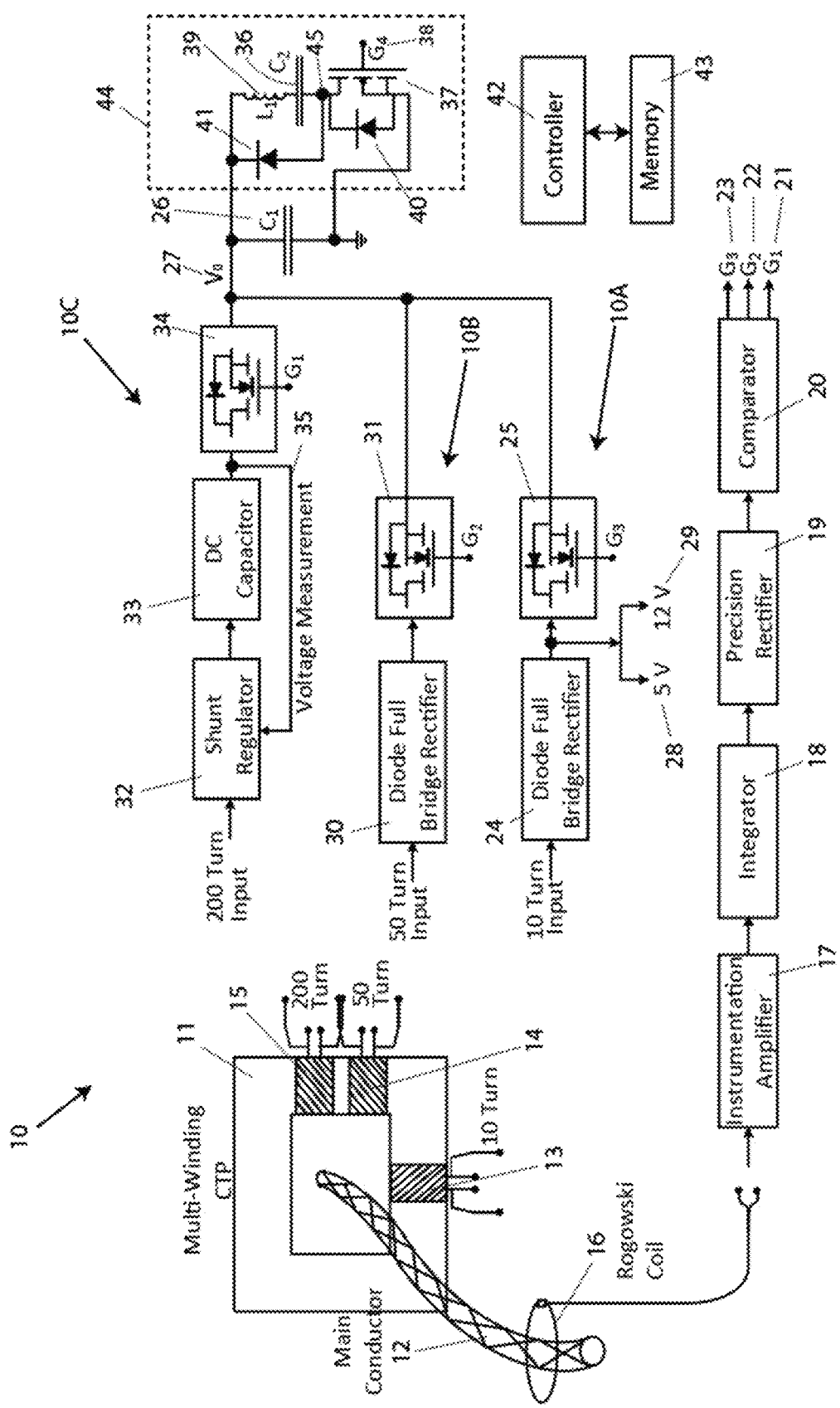
FIG. 1 is a circuit diagram of a power supply system in an embodiment of the present disclosure.

FIG. 1 depicts a circuit diagram for an example power supply 10 according to an embodiment. A multi-winding power current transformer (CTP) 11 is shown, having a main conductor 12 that is configured as a single turn primary winding. In a an embodiment, main conductor 12 is a power transmission line. A 10-turn secondary winding 13, a 50-turn secondary winding 14, and a 200-turn secondary winding 15 are shown. A Rogowski coil 16 is wound around main conductor 12 as shown; it provides a direct measurement of the rate of change of current in the primary winding. This direct measurement is fed to an instrumentation amplifier 17 in series with an integrator 18, the output of which is the present value of the primary current. The output of integrator 18 is fed into a precision rectifier 19 and the DC output of the rectifier is fed into a comparator 20 to create control signals $G_1$, 21; $G_2$, 22; and $G_3$ 23. As an example, $G_1$ may be active for currents in the range 0<I<199 A; $G_2$ may be active for currents in the range 200<I<799 A; and $G_3$ may be active in the range 800<I<180,000 A. Other current sensors may be used, such as the current transformer windings 13, 14 and 15, other current transformers, or Hall Effect sensors.

Three circuit branches are shown in this embodiment of power supply 10: 10A, 10B, and 10C. Any plurality of branches may be used in further embodiments. In FIG. 1 branch 10A receives its input from the 10-turn secondary winding 13. Branch 10B receives its input from the 50-turn secondary winding 14. Branch 10C receives its input from the 200-turn secondary winding 15.

Branch 10A includes a diode full bridge rectifier 24 in series with a pass switch 25 connecting to an output capacitor C1 26 having an output voltage $V_O$ 27. C1 26 may have a value of 50 μF-5 mF for example. Output voltage $V_O$ may be in a range of 20-40V for example, controlled within a 1 to 2 volt range. Pass switch 25 gated by $G_3$ may be a MOSFET as shown, although other types of transistors may be used. Diode full bridge rectifier 24 may have additional power outputs such as 5V 28 and 12V 29: these outputs may provide power to controller 42 for example. Controller 42 executes instructions contained in memory 43 to implement control algorithms in power supply 10.

Branch 10B includes a diode full bridge rectifier 30 in series with a pass switch 31 connecting to the common output capacitor C1 26, having the same output voltage $V_O$ 27. Pass switch 31 is gated by $G_2$ and may be a MOSFET as shown, or other switching device.

Branch 10C includes a shunt regulator 32 connected to a DC capacitor 33, whose voltage is measured. This voltage is scaled down and fed to the shunt regulator, and the scaling factor used is determined by the selected winding. The output of DC capacitor 33 connects through a pass switch 34 to the common output capacitor C1 26, having the same output voltage $V_O$ 27. Pass switch 34 is gated by $G_1$ and may be a MOSFET as shown, or other switching device.

In an embodiment, only one of the 3 branches may be active at any time, in terms of feeding energy to C1 26. The active branch is chosen by control signal $G_1$, $G_2$, or $G_3$, only one of which is active. As previously described, the active control signal is selected depending on the current range sensed in main conductor 12.

For providing power following a fault condition (shut-down power) or a low current condition, an energy storage circuit 44 may be included in power supply 10. The fault condition may cause the current flowing in the transmission line (main conductor 12) to rapidly reduce to zero after the fault. Subsequently, current in the secondary windings will also reduce to zero. An asymmetric fault current may also cause current transformer 11 to go into saturation and this may also cause the output voltage $V_O$ to drop below the desired range. The shut-down power allows controller 42 to shut down the power flow control unit in a controlled and pre-determined manner.

Energy storage circuit 44 includes a large capacitor C2 36 that stores the desired shut down energy; it may have a value of 100 μF-10 mF for example. The energy stored in C2 36 provides a minimum power level of around 30 W for a minimum duration of around 50 milliseconds in order to conduct shutdown operations. For example, this level of power may be sufficient to perform a backup of operating parameters in the local memory of a host power flow control unit. In series with C2 is a pass switch 37 gated by a control signal $G_4$ 38. The objective of the energy storage circuit is to maintain a power level of 30 W for 0.05 seconds, or more in further embodiments, following zero current in the main conductor 12. Control signal G4 is employed to maintain output voltage $V_O$ within an acceptable range of 1 to 2V around the desired DC value. For example, if the desired value of $V_O$ is 30V, the controller may raise $G_4$ to a high level (causing pass switch 37 to conduct) when $V_O$>29V, and may lower $G_4$ to a low level (causing pass switch 37 to shut off) when $V_O$<28V. In other words, C2 may be charged when the predetermined DC voltage rises above a first threshold, and not charged when the predetermined DC voltage drops below a second threshold, wherein the first and second thresholds are spaced apart by approximately 1 volt, or other amounts in further embodiments. C2 is discharged when it provides power to the associated power flow control unit through diode 41. Diode 41 provides tracking between node 45 and output node $V_O$, 27. Diode 40 is included in pass switch 37. Inductor $L_1$ 39 is provided in series with C2 to limit surge currents into or out of C2.

Figure 2:
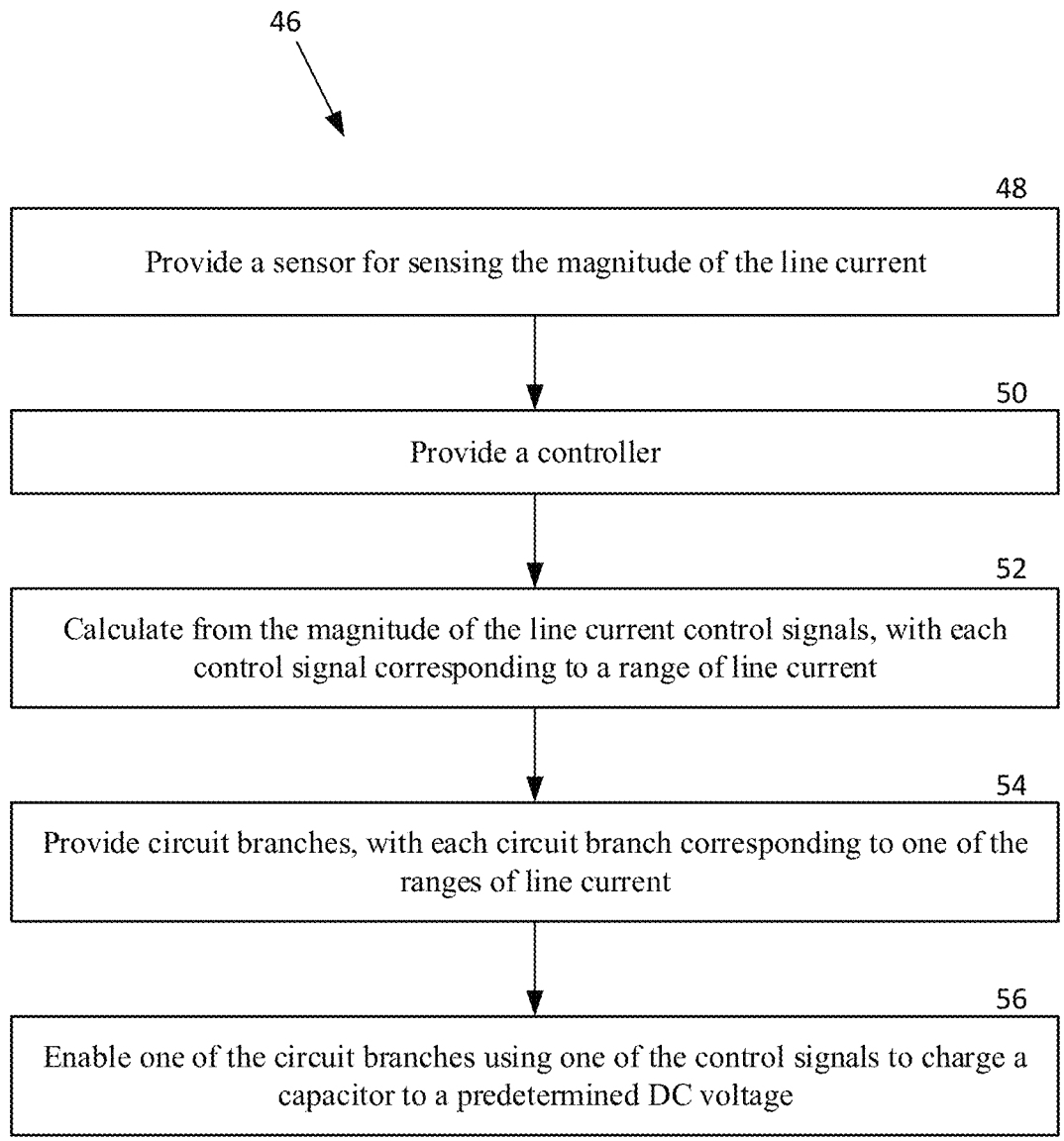
FIG. 2 is a flow chart of a method in an embodiment of the present disclosure.

FIG. 2 is a flow chart 46 illustrating an example method for harvesting power from a transmission line carrying a variable line current according to an embodiment. In step 48 a sensor is provided for sensing the magnitude of the line current. A controller is provided in step 50. In step 52 the controller executes instructions contained in memory to calculate from the magnitude of the line current the binary state of each of a plurality of control signals, each signal corresponding to a distinct range of line current. Only one of the plurality of control signals is active at any time. In step 54 a plurality of circuit branches is employed, each branch corresponding to one of the distinct ranges of line current. Finally, in step 56 the controller enables one of the circuit branches by activating one of the control signals, to charge a capacitor to a predetermined DC voltage.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A power supply system operable to harvest power from a power transmission line of a power grid at low and high line currents, the power supply system comprising:
   a current transformer having a primary winding and a plurality of secondary windings, the primary winding arranged to couple to the power transmission line of the power grid;
   a current sensor arranged to couple to the power transmission line to sense line current of the power transmission line;
   an output capacitor;
   a plurality of branches of power supply circuitry, each connected to one of the plurality of secondary windings and having a switch, and each connected to the output capacitor; and
   a control circuit coupled to the current sensor and coupled to the switches in the plurality of branches of power supply circuitry, to select the switch of one of the plurality of branches of power supply circuitry, depending on sensed magnitude of the line current of the power transmission line, to provide electrical power to the output capacitor.

2. The power supply system of claim 1, wherein the output capacitor is configured to provide a DC (direct current) power output.

3. The power supply system of claim 1, wherein the output capacitor has a capacitance in a range of 100 microfarads to 10 millifarads.

4. The power supply system of claim 1, wherein each of the plurality of branches of power supply circuitry is operable to handle a differing range of line current.

5. The power supply system of claim 1, wherein one of the plurality of branches of power supply circuitry is operable to handle a range of line currents including a fault current up to 180 kA (kiloamperes) having a duration of one second.

6. The power supply system of claim 1, wherein the control circuit is adaptive to non-linear changes in line current.

7. The power supply system of claim 1, wherein the electrical power to the output capacitor comprises a power level for a host impedance injection module to enter injection mode when the line current is 50 amps.

8. The power supply system of claim 1, wherein:
one or more of the plurality of branches of power supply circuitry include(s) a shunt regulator to shunt excess energy during a spike in the line current.

9. The power supply system of claim 1, wherein the plurality of branches of power supply circuitry comprise three branches.

10. The power supply system of claim 1, further comprising an energy storage circuit coupled to the output capacitor.

11. The power supply system of claim 1, further comprising an energy storage circuit coupled to the output capacitor and having a further capacitor of greater capacitance than the output capacitor.

12. The power supply system of claim 1, wherein the power supply system is operable to deliver power to a host power flow control unit to communicate commencement of a shutdown procedure.

13. The power supply system of claim 1, further comprising:
an energy storage circuit coupled to the output capacitor and having a further capacitor and a switch; and
a controller coupled to the energy storage circuit, to control the switch to charge the further capacitor.

14. The power supply system of claim 1, further comprising:
an energy storage circuit coupled to the output capacitor and having a further capacitor in series with a current limiting inductor.

15. The power supply system of claim 1, wherein:
the control circuit comprises a Rogowski Coil in series with an amplifier, an integrator, a rectifier and a comparator,
the output of the comparator comprises control signals to control the plurality of branches of power supply circuitry.

16. The power supply system of claim 1, wherein:
at least one of the plurality of branches of power supply circuitry comprises a diode full bridge rectifier in series with a pass switch controlled by the control circuit.

17. A method for harvesting power from a variable line current of a power transmission line of a power grid, comprising:
coupling a current sensor to the power transmission line of the power grid for sensing the line current of the power transmission line;
coupling to the power transmission line a primary winding of a current transformer having the primary winding and a plurality of secondary windings; and
selecting, in a control circuit coupled to the current sensor, one of a plurality of branches of power supply circuitry coupled to the plurality of secondary windings of the current transformer, based on sensed magnitude of the line current of the power transmission line, to provide electrical power to an output capacitor.

18. The method of claim 17, further comprising:
shunting excess electrical energy through a shunt regulator in at least one of the plurality of branches of power supply circuitry, for handling large, continuous or transient fault currents.

19. The method of claim 17, further comprising:
charging a further capacitor in an energy storage circuit coupled to the output capacitor, to maintain a minimum power level of around 30 W for a minimum duration of around 50 milliseconds following a rapid decrease of the line current to zero amps following a fault.

20. The method of claim 17, further comprising:
adapting to nonlinear transients in line current while maintaining a predetermined DC (direct current) voltage at the output capacitor.

* * * * *